United States Patent
Nikles

(10) Patent No.: US 10,031,043 B2
(45) Date of Patent: Jul. 24, 2018

(54) METHOD AND APPARATUS FOR DETECTING A STRUCTURAL FAULT IN A STRUCTURE USING A BRILLOUIN GAIN SPECTRUM OBTAINED AT A POINT ALONG A SENSING OPTICAL FIBER

(71) Applicant: OMNISENS SA, Morges (CH)

(72) Inventor: Marc Nikles, Attalens (CH)

(73) Assignee: OMNISENS SA, Morges (CH)

(*) Notice: Subject to any disclaimer, the term of this patent is extended or adjusted under 35 U.S.C. 154(b) by 287 days.

(21) Appl. No.: 15/039,493

(22) PCT Filed: Dec. 2, 2013

(86) PCT No.: PCT/EP2013/075264
§ 371 (c)(1),
(2) Date: May 26, 2016

(87) PCT Pub. No.: WO2015/081976
PCT Pub. Date: Jun. 11, 2015

(65) Prior Publication Data
US 2017/0016801 A1  Jan. 19, 2017

(51) Int. Cl.
| | | |
|---|---|---|
| G01M 5/00 | (2006.01) | |
| G01K 11/32 | (2006.01) | |
| G01M 11/08 | (2006.01) | |
| G01L 1/24 | (2006.01) | |
| G01M 3/38 | (2006.01) | |

(52) U.S. Cl.
CPC .......... *G01M 5/0033* (2013.01); *G01K 11/32* (2013.01); *G01L 1/242* (2013.01); *G01M 3/38* (2013.01); *G01M 5/0091* (2013.01); *G01M 11/085* (2013.01); *G01K 2011/322* (2013.01)

(58) Field of Classification Search
CPC .... G01M 5/0033; G01M 3/38; G01M 5/0091; G01D 5/35364; G01K 11/32; G01K 2011/322; G01L 1/242
USPC ............................................. 250/221, 227.23
See application file for complete search history.

(56) References Cited

U.S. PATENT DOCUMENTS

| | | | |
|---|---|---|---|
| 8,744,782 B2* | 6/2014 | Chen ...................... | G01K 11/32 702/41 |
| 2012/0123702 A1 | 5/2012 | Chen et al. | |

OTHER PUBLICATIONS

International Search Report for PCT/EP2013/075264 dated Jul. 30, 2014.

* cited by examiner

*Primary Examiner* — Que T Le
(74) *Attorney, Agent, or Firm* — Pearne & Gordon LLP

(57) ABSTRACT

A method for detecting a structural fault in a structure includes the steps of, (a) performing a Brillouin measurement at a point along a sensing optical fiber which operably cooperates with the structure, to obtain a Brillouin gain spectrum at that point; (b) identifying at least two curves which, when added together, best fit the Brillouin gain spectrum; (c) identifying if peaks of the least two curves occur at different frequencies so as to determine if the structure has a structural fault. There is further provided a corresponding apparatus for detecting a structural fault in a structure.

15 Claims, 8 Drawing Sheets

METHOD AND APPARATUS FOR DETECTING A STRUCTURAL FAULT IN A STRUCTURE USING A BRILLOUIN GAIN SPECTRUM OBTAINED AT A POINT ALONG A SENSING OPTICAL FIBER

FIELD OF THE INVENTION

The present invention concerns a method and apparatus for detecting a structural fault in a structure, and in particular to a method and apparatus which involves identifying two or more curves which, when added together, best fit the Brillouin gain spectrum, and determining, based on the frequencies at which the peaks of those two or more curves occur, whether there is a structural fault in a structure.

DESCRIPTION OF RELATED ART

Distributed temperature monitoring is currently deployed for leak monitoring along gas, oil or multiphase pipelines. As example, when gas leaks from a pipe, a cold spot is created due to the Joules-Thomson effect. This cold spot gradually propagates through the soil and the local temperature variation can be detected and localized by using a distributed temperature measurement technique.

It is fundamental to detect leaks as quickly as possible, namely before they result in a pipeline break or a large spill polluting the surrounding soil. Such small leaks have an impact radially all around the pipe and they will also extend longitudinally along the pipe over time. As a result, the perturbation is typically limited to a length of half a meter.

One approach to leak detection in pipes, using a distributed temperature measurement technique, is based on the Raman scattering; namely the intensity variation of the Raman backscattered light in an optical fiber laid in the vicinity of the pipeline. When a powerful light pulse of wavelength $\lambda_0$ (or frequency $v_0 = c/\lambda_0$, wherein c is the speed of light), known as the pump, propagates through the optical fibre, a small amount of the incident power is scattered in every directions due to atomic or molecular vibrations within the optical fibre. The atomic or molecular vibrations within the optical fibre arise due to temperature variations within the optical fibre which are caused by a fluid leaking from the pipe. The light which is scattered is referred to as Raman backscattered light. The intensity information of Raman backscattered light can be exploited to measure the local temperature along the optical fibre.

The techniques of distributed temperature measurement based on the Raman scattering are limited in that they can only provide a spatial resolution of 10 meters or more when using optical fibers which are about 20 km long or more; such a long spatial resolution is insufficient to reliably detect leaks along the pipe; and very often leaks will go undetected.

An alternative and yet better approach to leak detection in pipes, is the use of a distributed Brillouin measurement technique which is based on Brillouin scattering. When a powerful light pulse of wavelength $\lambda_0$ (or frequency $v_0 = c/\lambda_0$, wherein c is the speed of light), known as the pump, propagates through the optical fibre, a small amount of the incident power is scattered in every directions due thermally excited acoustic waves. The light which is scattered is referred to as Brillouin backscattered light.

The frequency information of Brillouin backscattered light can be exploited to measure the local temperature along the optical fibre. When a leakage in the pipe occurs it will change the temperature of the optical fiber. A change in the temperature of the optical fiber will cause a change in the frequency of the Brillouin backscattered light; thus a change in the frequency of the Brillouin backscattered light indicates that a leak is present in the pipe.

Distributed Brillouin measurement techniques are inherently more reliable and more stable than any intensity-based technique, based on the Raman effect, which are sensitive to drifts, losses and variations of attenuations. As a result, the Brillouin based technique offers long term stability and large immunity to attenuation. In addition, the Brillouin scattering must satisfy a very strict phase condition, making the interaction to manifest as a spectrally narrow resonance, resulting in an accurate measurement. This process of propagating a pulse of light into the optical fibre and measuring the backscattering signal is called Spontaneous Brillouin Scattering (SPBS): it is a weak processing which leads to a low intensity scattered light.

The Brillouin scattering process has the particularity that it can be stimulated by a second optical signal—called the probe—in addition to the first optical signal—called the pump—that generated the scattering, providing that the probe fulfils specific conditions. This property is especially interesting for sensing applications and can be achieved by the use of a probe counter propagating with respect to the pump. Stimulation of Brillouin backscattering is maximized when pump and probe frequencies (or wavelengths) are exactly separated by the Brillouin shift. In this case, the energy transferred from the pump to the probe (or vice and versa depending on the selected Stokes/antistokes backscattering signal) results in a greatly enhanced backscattered intensity and thus a larger Signal-to-Noise Ratio (SNR). This is seen as a resonant phenomenon where an amplification of the probe power occurs at the expense of the pump when the resonant condition is fulfilled, i.e. when the frequency difference between pump and probe matches the local Brillouin frequency. In the known solutions the pump is composed by one or more nanoseconds long optical pulses and the probe by a Continuous Wave-CW light, as it will be discussed.

Optoelectronic measurement devices based on Stimulated Brillouin Backscattering (SBS) are known as Brillouin Optical Time Domain Analysers or BOTDA; as opposed to Brillouin Optical Time Domain Reflectometers (BOTDR) which are based on spontaneous Brillouin backscattering (SPBS).

An optoelectronic measurement device based on BOTDA normally performs a frequency domain analysis and a time domain analysis. Frequency domain analysis: the temperature information is coded in the Brillouin frequency shift. Scanning the probe frequency with respect to the pump while monitoring the intensity of the backscattered signal allows to find the Brillouin gain peak, and thus the corresponding Brillouin shift, from which the temperature or the strain can be computed. This is achieved by using two optical sources, e.g. lasers, or a single optical source from which both the pump signal and the probe signal are created. In this case, an optical modulator (typically a telecommunication component) is used to scan the probe frequency in a controlled manner. Time domain analysis: due to the pulsed nature of the pump, the pump/probe interaction takes place at different location along the fibre at different times. For any given location, the portion of probe signal which interacted with the pump arrives on a detector after a time delay equal to twice the travelling time from the fibre input to the specified location. Thus, monitoring the backscattered intensity with respect to time, while knowing the speed of light in the fibre, provides information on the position where the scattering took place.

Typical commercial optoelectronic measurement devices based on BOTDA can measure temperature/strain over 30 km of fibre with a spatial resolution of 1 m (equivalent to 30'000 distinct independent sensors). The resolution on temperature is typically <1 K. The limits are given by the fibre linear loss and the presence of other nonlinear effects screening the interaction that prohibit any power increase to compensate the loss.

Although distributed Brillouin measurement techniques have a shorter resolution than those techniques which use Raman scattering, the spatial resolution is still insufficient to reliably detect leaks along the pipe; and very often leaks will go undetected.

It is an aim of the present invention to mitigate or obviate at least some of the above-mentioned disadvantages. Specifically, it is an aim of the present invention to provide a method and device which can more reliably detect leaks in pipes.

BRIEF SUMMARY OF THE INVENTION

According to an aspect of the present invention there is provided A method for detecting a structural fault in a structure, comprising the steps of, (a) performing a Brillouin measurement at a point along a sensing optical fiber which operably cooperates with the structure, to obtain a Brillouin gain spectrum at that point; (b) identifying at least two curves which, when added together, best fit the Brillouin gain spectrum; (c) identifying if peaks of the least two curves occur at different frequencies so as to determine if the structure has a structural fault.

If peaks of the least two curves occur at different frequencies this will indicate that there is a structural fault in the region of the structure which is adjacent to the point along the optical sensing fiber where the Brillouin measurement was performed. Preferably, if peaks of the least two curves occur at different frequencies this will indicate that there is a structural fault present in the structure within +/−one sensing instrument spatial resolution) of the point along the optical sensing fiber where the Brillouin measurement was performed. For a one meter spatial resolution, the default is expected to be within +/−1 m. The spatial resolution is defined as the length of fiber that is measured simultaneously by the instrument.

The structural fault may be a structural fault which gives rise to strain in the structure. The structural fault may be a crack in the structure which results in stain in the structure. In the case of a riser for example, the structural fault may be breakage of metal wires (for example metal armoured wires of the riser) of the riser structure which gives rise to strain within the riser structure. In another example the structural fault in the structure may be caused by ground movement; for example, if the structure is an underground pipe, then the structural fault may be caused by movement of the ground which is around a pipe which locally deforms the pipe eventually resulting in a structural fault such as a crack. In another example the structural fault in the structure may be caused by bending of the structure; for example the structural fault may be caused in an umbilical which has been bent by stormy weather conditions.

The structural fault may be a crack in the structure. The structural fault may be a crack in the structure through which fluid leaks out of the structure or through which fluid leaks into the structure (ingress).

It will be understood that a leak in the context of the present application includes both leaks in which fluid leaks out of the structure and also leaks in which fluid leaks into the structure (i.e. ingress).

The term 'structure' includes, but is not limited to, a pipe, riser, an umbilical, a flowline, a power cable etc. Preferably the term 'pipe' in the context of the present application refers to a longitudinal structure. The longitudinal structure may optionally be hollow; optionally the hollow structure may comprise for example cables and/or fluid or other material. It will be understood that one or more fluids may flow in the pipe. It will be understood that electrical cables may be provided in the pipe. A riser is a subsea pipe which is typically used to lift up oil to a platform; the riser is typically tubular and is made of multiple layers of armoured steel wires and polymer.

A leak in a structure will result from a structural fault in the structure e.g. will result from a crack in the structure; therefore it should be understood that the method of the present invention may be used for detecting a leak in a structure e.g. for detecting a leak in a pipe, riser, an umbilical, or a flowline. For example, to detect a leak in a pipe the method may comprise the steps of (a) performing a Brillouin measurement at a point along a sensing optical fiber which operably cooperates with the pipe, to obtain a Brillouin gain spectrum at that point; (b) identifying at least two curves which, when added together, best fit the Brillouin gain spectrum; (c) identifying if peaks of the least two curves occur at different frequencies so as to determine if a leak is present in the pipe. The method of the present invention may also be used to detect a structural weakness, such as cracks, in structures such as pipes, risers, umbilicals, flowlines and/or power cables.

The at least two curves may comprise a Lorentzian curve and/or a Gaussian curve. It will be understood that the at least two curves may each be defined by any other any suitable function.

It will be understood that if peaks two curves occur at different frequencies then the peaks of the two curves may then be offset from one another.

Preferably the at least two curves are those curves which, when added together, form a line of best fit for the Brillouin gain spectrum.

In one embodiment two curves are identified which, when added together, best fit the Brillouin gain spectrum. If the peaks of the two curves occur at different frequencies, this indicates that there is structural fault in the structure (e.g. a crack in the pipe) in the region of the structure which is adjacent to the point in sensing optical fiber where the Brillouin measurement was performed. If the peaks of the two curves are aligned, this indicates that there is no structural fault in the structure in the region of the structure which is adjacent to the point in sensing optical fiber where the Brillouin measurement was performed. Or if one of the curves has no peak at all, or has a peak which has an amplitude which is less than 1% of the amplitude of the peak of the other curve, this indicates that there is no structural fault in the structure in the region of the structure which is adjacent to the point in sensing optical fiber where the Brillouin measurement was performed.

The sensing optical fiber may be made to operably cooperate with the structure by locating the sensing optical fiber relative to the structure such that temperature or strain changes which occur in the structure affect the optical properties of the sensing optical fiber. For example, the sensing optical fiber may be located in a trench adjacent to the structure. For example the sensing optical fiber may be located in a trench which is within 30 cm of the structure e.g. an underground pipe; this will ensure that temperature or strain changes which occur in the structure, or temperature or strain changes which occur in the soil adjacent to structure affect the optical properties of the sensing optical fiber.

For example if the structure is a pipe, the sensing optical fiber may be laid adjacent to the pipe in a trench, prior or during backfill. In other words the sensing optical fiber may be mechanically independent of the structure. It will be understood that many other cooperations between the sensing optical fiber and structure are possible to ensure operable cooperation; for example the sensing optical fiber may be attached to the structure using any suitable attachment means e.g. fasteners e.g. attached to the surface of the structure, the sensing optical fiber may be embedded in the structure, e.g integrated into extruded part of the structure or as a replacement of part of the structure, blown or floated using fluid into a tube preliminary integrated into the structure. For example, the sensing optical fiber may be integral to the structure. In a further example, if the structure is a riser, the sensing optical fiber may be located inside any of the multiple layers forming the riser.

The Brillouin gain spectrum which is obtained will preferably comprise a peak. Each of the at least two curves which, when added together, best fit the Brillouin gain spectrum, will each preferably contain a peak.

For example, the method may comprises the steps of, identifying out of the least two curves, the curve whose peak occurs at a frequency which is, equal to, or within +−10 MHz of the frequency at which the peak of the Brillouin gain spectrum occurs, as being a reference curve; and determining if hot or cold fluid is leaking through the structure at the structural fault based on whether the peak of the other of the at least two curves is offset to the left or right of the peak of the reference curve. Preferably the peak of the reference curve occurs at a frequency which is equal to the frequency at which the peak of the Brillouin gain spectrum occurs.

The method may comprises the step of, determining that a hot fluid is leaking through the structural fault if the peak of one of the other of the at least two curves is offset to the right of the peak of the reference curve.

The method may comprises the step of, determining that a cold fluid is leaking through the structure at the structural fault if the peak of one of the other of the at least two curves is offset to the left of the peak of the reference curve.

The method may comprise the step of, identifying three curves which, when added together, best fit the Brillouin gain spectrum. In other words the method may comprise the step of, identifying three curves which, when added together, form a line of best fit for the Brillouin gain spectrum.

The method may comprise the steps of, identifying, out of the three curves, the curve whose peak occurs at a frequency which is, equal to, or within +−10 MHz of the frequency at which the peak of the Brillouin gain spectrum occurs, as being a reference curve; and identifying if the peaks of the other two curves occur at different frequencies to the frequency at which the peak of the reference curve occurs, so as to determine if a structural fault is present in the structure in the region of the structure which is adjacent to the point in sensing optical fiber where the Brillouin measurement was performed; and, if it is determined that a structural fault is present in the structure, then carrying out the step(s) of, determining that a hot fluid is leaking through the structure at the structural fault if the peak of one of the two other curves is offset to the right of the peak of the reference curve; and/or determining that a cold fluid is leaking through the structure at the structural fault if the peak of the other one of the two other curves is offset to the left of the peak of the reference curve. Preferably the peak of the reference curve occurs at a frequency which is equal to the frequency at which the peak of the Brillouin gain spectrum occurs.

The method may comprise the steps of, identifying, out of the three curves, the curve whose peak occurs at a frequency which is, equal to, or within +−10 MHz of the frequency at which the peak of the Brillouin gain spectrum occurs, as being a reference curve; and identifying one of the two other curves as being associated with physical properties of the sensing optical fiber; determining if a structural fault is present in the structure if the peak of the other one of the two other curves occurs at a different frequencies to the frequency at which the peak of the reference curve occurs. Preferably the peak of the reference curve occurs at a frequency which is equal to the frequency at which the peak of the Brillouin gain spectrum occurs.

The method may further comprise the step of determining if hot or cold fluid is leaking from the structure at the structural fault if the peak of the other one of the two other curves is offset to the right or left of the peak of the reference curve.

The step of identifying one of the two other curves as being associated with physical properties of the sensing optical fiber, may comprise the step of performing a calibration step which comprises performing a Brillouin measurement at a point along a sensing optical fiber which cooperates with a part of the structure which has no structural fault, to obtain a Brillouin gain spectrum at that point; identifying three curves which, when added together, best fit the Brillouin gain spectrum; and identifying the curve whose peak occurs at a frequency which is, equal to, or within +−10 MHz of the frequency at which the peak of the Brillouin gain spectrum occurs, as being a reference curve; and identifying the one of the two other curves, which has a peak at a frequency which is different to the frequency at which the peak of the reference curve occurs, as being associated with physical properties of the sensing optical fiber. Preferably the curve which is associated with physical properties of the sensing optical fiber will be the same for each point along the sensing optical fiber; therefore when testing for structural faults at other points along the structure the curve associated with physical properties of the sensing optical fiber can be easily identified as those curves which are equal to the curve associated with physical properties of the sensing optical fiber which was identified in the calibration step. The calibration step is preferably performed while maintaining the sensing optical fiber at a constant temperature. Therefore, the step of identifying one of the two other curves as being associated with physical properties of the sensing optical fiber, may comprise the step identifying the one of the two other curves which has a peak occurring at a frequency equal to, or within +−10 MHz of the frequency at which the peak of curve associated with physical properties of the sensing optical fiber in a calibration step occurred. The physical properties of the sensing optical fiber are usually dependent on the manufacturing process or its optical design, which is part of the fiber intrinsic properties.

The method may further comprise the step of, determining an offset by measuring the difference between the frequency at which the peak of the reference curve occurs and the frequency at which the peak of the curve associated with physical properties of the sensing optical fiber occurs. The offset represents the effect of the physical properties of the sensing optical fiber e.g. the fiber intrinsic properties, on the Brillouin gain spectrum of the sensing optical fiber.

When a fiber has been identified for having two Brillouin peaks, the offset between the frequency at which the peak of the reference curve occurs and the frequency at which the peak curve associated with physical properties of the sensing optical fiber occurs is used in the computation of the line of best fit to reduce the number of variables for the curves of best fit; identifying two or more curves which, when added together, best fit the Brillouin gain spectrum, comprises fixing one of the two or more curves so that its peak occurs at a frequency which is equal to the frequency at which the peak of the curve associated with physical properties of the sensing optical fiber occurred in the calibration step. Each curve is preferably mathematically defined by, a center frequency parameter, an amplitude parameter and a width parameter, for example, thereby providing a total of six parameters to the fitting function (it will be understood that in the case that three curves of best fit are to be calculated, then there are nine parameters to the fitting function); by fixing the peak of one of the curves to occur at a frequency which is equal to the frequency at which the peak of the curve associated with physical properties of the sensing optical fiber occurred in the calibration step, there is one less variable parameter; remaining variable parameters are then adjusted to find the curves when added together best fit the Brillouin gain spectrum.

The method may further comprise the step of, repeating any one or more of steps mentioned above, at a plurality of points along the optical sensing optical fiber. Preferably sensing optical fiber will extend along the whole length of the structure e.g. along the whole length of the pipe, riser, power cable, or umbilical, and one or more of steps mentioned above are repeated at a plurality of points along the whole length of the sensing optical fiber so that the whole length of the structure is tested for the presence of a structural faults.

The step of identifying at least two curves which, when added together, best fit the Brillouin gain spectrum, may comprise using least mean squares method. The at least two curves which, when added together, best fit the Brillouin gain spectrum, may be identified using any other suitable means. The step of identifying at least two curves which, when added together, best fit the Brillouin gain spectrum, may comprise using a fitting function. The fitting function may be defined for example as the addition of at least two curves where the parameters defining the two curves are fit variables. When the at least two curves are Lorentzian, each is preferably mathematically defined by, a center frequency parameter, an amplitude parameter and a width parameter, for example, thereby providing a total of six parameters to the fitting function. The least mean square or any suitable fitting algorithm aims at minimising the difference between the fitting function and the Brillouin gain spectrum by varying the six parameters. When the difference is minimum, or below at given small value, then a line of best fit is obtained.

According to a further aspect of the present invention there is provided an apparatus for detecting a structural fault in a structure, the apparatus comprising, a Brillouin measurement means which is operable to take a Brillouin measurement at a point along a sensing optical fiber which cooperates with the structure, so as to obtain a Brillouin gain spectrum at that point; a processor which is operable to receive a Brillouin gain spectrum obtained by the Brillouin measurement means, and to identify at least two curves which, when added together, best fit the Brillouin gain spectrum.

The processor may be further configured to, present said at least two curves so that a user can inspect the at least two curves to identify if peaks of the least two curves occur at different frequencies, so as to determine if a structural fault is present in the structure; and/or to identify if peaks of the least two curves occur at different frequencies, so as to determine if a structural fault is present in the structure.

The processor may be configured such that it can perform any of the method steps mentioned above.

BRIEF DESCRIPTION OF THE DRAWINGS

The invention will be better understood with the aid of the description of embodiments of the invention, which are given by way of example only, and illustrated by the figures, in which:

FIG. 6 is a flow chart illustrating a method for detecting a leak in a pipe according to a further embodiment of the present invention in which the physical properties of the sensing optical fiber are accounted for;

DETAILED DESCRIPTION OF POSSIBLE EMBODIMENTS OF THE INVENTION

As mentioned above the present invention provides a method for detecting a structural fault in a structure. Any type of structural fault in any type of structure may be detected. The embodiment described in the following description will relate to detecting of a structural fault in the form of a crack in a pipe; in the example fluid flows in the pipe and the fluid leaks through the crack pipe out of the pipe (it will be understood that additionally, or alternatively, fluid may leak through the crack into the pipe i.e. ingress). However, it should be understood that the present invention is not limited to detecting cracks in a pipe, for example the method may be used to detect any other structural faults, such as any structural faults which gives rise to strain, or a dent or deformation, in any other type of structure, such as a riser, power cable, or umbilical, or a tubular structure which contains fibers or cables, and the like. For example, if the structure is buried in soil, the soil may move increasing the pressure the soil applies to structure and creating a structural fault in the pipe. It should be noted that the structural fault may not necessarily be visible to the naked eye. It should be understood that because the present invention could be used to detect structural faults which gives rise to strain within a structure, the method of the present invention can thus be used to detect if there is any strain occurring in the structure.

Figure 1:
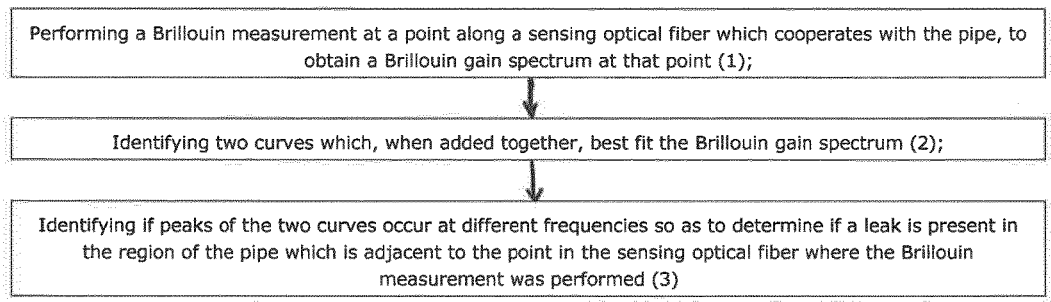
FIG. 1 is a flow chart illustrating the steps performed in a method for detecting a leak in a pipe according to an embodiment of the present invention.

FIG. 1 is a flow chart illustrating the steps performed in a method for detecting a structural fault in a pipe according to an embodiment of the present invention. The method illustrated in FIG. 1 comprises the steps of, performing a Brillouin measurement at a point along a sensing optical fiber which cooperates with the pipe, to obtain a Brillouin gain spectrum at that point (1). Next, two curves which, when added together, best fit the Brillouin gain spectrum, are identified. In other words the two curves, when added together, form line of best fit for the Brillouin gain spectrum. Finally, the step of identifying if peaks of the two curves occur at different frequencies (3) is performed, so as to determine if a structural fault is present in the region of the pipe which is adjacent to the point on the sensing optical fiber where the Brillouin measurement was performed.

Figure 2:
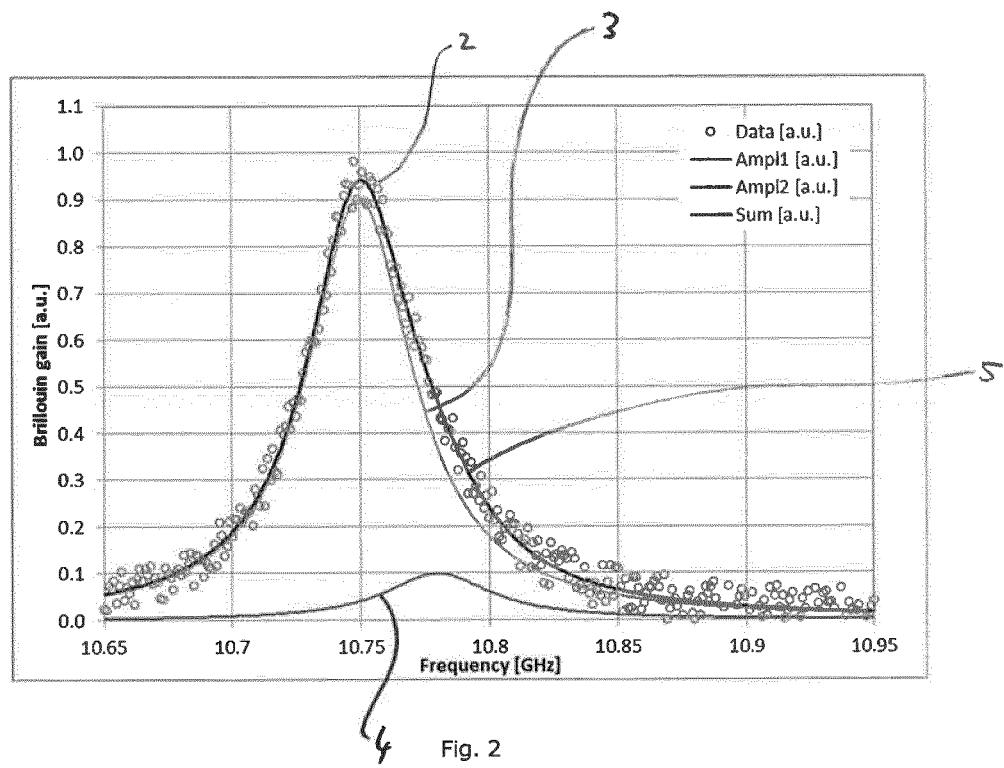
FIG. 2 is a graph showing an example of Brillouin gain spectrum and two curves which, when added together, best fit the Brillouin gain spectrum.

FIG. 2 is a graph showing an example of Brillouin gain spectrum 2 obtained after performing a Brillouin measurement at a point along a sensing optical fiber which is operable cooperation with a pipe in which fluid flows. The Brillouin gain spectrum has a peak at 10.75 GHz as shown in the graph.

The graph of FIG. 2 also shows two curves 3,4 (i.e. first curve 3 and second curve 4) which have been identified as the two curves which best fit the Brillouin gain spectrum 2 when they are added together. In other words the two curves 3,4, when added together form a line of best fit 5 for the Brillouin gain spectrum 2. It will be understood that any suitable technique may be used to identify the first and second curves 3,4 which, when added together, best fit the Brillouin gain spectrum 2; for example, a least mean square calculation may be used, or any other suitable fitting technique.

It will also be understood that the present invention is not limited to identifying two curves; any number of curves which best fit the Brillouin gain spectrum may be identified. In this example, the first and second curves 3,4 are each Lorentzian curves; however it will be understood that the curves 3,4 may take any other suitable profile depending on the Brillouin gain spectrum 2 e.g the first and second curves 3,4 may each be Gaussian curves.

The first curve 3 and second curve 4 each have a peak. It can be seen in the graph that the peaks of the first and second curves 3,4 are offset from one another; the peak of the first curve 3 occurs at 10.75 GHz and the peak of the second curve 4 occurs at 10.78 GHz. Since the peaks of the first and second curves 3,4 occur at different frequencies (i.e. are offset from one another), it can be determined that there is a structural fault is in the region of the pipe which is adjacent to the point on the sensing optical fiber where the Brillouin measurement was performed. In this example the structural fault happens to be crack in the pipe; fluid which is flowing in the pipe is leaking through the crack.

If one of the first or second curves 3,4 has no peak, or if one of the first or second curves 3,4 had a peak which was less than 1% of the amplitude of the peak of the other curve, of if the peaks of the first and second curves 3,4 occur at the same frequency, then this would indicate that there is no structural fault in the region of the pipe which is adjacent to the point on the sensing optical fiber where the Brillouin measurement was performed.

It will be understood that the sensing optical fiber will preferably extend along the whole length of the pipe; and that the steps illustrated in the flow chart of FIG. 1 are preferably repeated at each of a plurality of different points along the whole length of the sensing optical fiber, so that the whole length of the pipe is tested for structural faults.

In this example the method comprises a further step in which the curve which has a peak occurring at the same frequency as the Brillouin gain spectrum is identified as a reference curve. As can be seen in the graph of FIG. 2, the peak of the first curve 3 occurs at the same frequency (i.e. 10.75 GHz) as the frequency at which the peak of the Brillouin gain spectrum occurs; accordingly the first curve 3 is identified as a reference curve 3. In practice, due to non idealities, the peak of the reference curve 3 may be offset from the peak of the Brillouin gain spectrum 2 by between +−10 MHz; therefore in another embodiment there is at least a tolerance of +−10 MHz; thus the method may alternatively comprise the step of identifying which curve has its peak occurring at a frequency which is within +−10 MHz of the frequency at which the peak of the Brillouin gain spectrum occurs, as a reference curve. More preferably, the method may alternatively comprise the step of identifying which curve has its peak occurring at a frequency which is within +−2 MHz of the frequency at which the peak of the Brillouin gain spectrum occurs, as a reference curve. Most preferably the method may alternatively comprise the step of identifying which curve has its peak occurring at a frequency which is within +−1 MHz of the frequency at which the peak of the Brillouin gain spectrum occurs, as a reference curve.

The amplitude of the first curve 3 is greater than the amplitude of the second curve 4. In a variation of embodiment the reference curve 3 may alternatively be identified based on which of the curves 3,4 has the largest amplitude; this provides the same result as the identification of the reference curve based on which of the curves has its peak at the same frequency as, or within +−10 MHz, +−2 MHz or +−1 MHz of, the frequency at which the peak of the Brillouin gain spectrum occurs. In this example since the first curve 3 has an amplitude greater than the amplitude of the second curve 4, the first curve 3 is thus identified as a reference curve 3.

In this example fluid, which is flowing in the pipe, leaks through the crack in the pipe. It can be determined based on the position of the peak of the second curve 4 relative to the position of the peak of the reference curve 3, whether the fluid which is leaking from the pipe is a hot or cold fluid (i.e. a hot or cold leak). For example, if gas leaks from a pipe it will create a cold leak; when oil or water leaks from the pipe this will typically create a hot leak. If the peak of the second curve 4 is offset to the right of the peak of the reference curve 3, this signifies that a hot fluid is leaking from the pipe through the crack (structural fault); if the peak of the second curve 4 is offset to the left of the peak of the reference curve 3, this signifies that a cold fluid is leaking from the pipe through the crack (structural fault). In the example illustrated in FIG. 2 the peak of the second curve 4 is offset to the right of the reference curve 3 indicating that hot fluid is leaking from the pipe through the crack (structural fault). The same is true for fluid leaking into the pipe through the crack (i.e. ingress).

It should be understood that if the structural default in the structure results in strain; then the peaks of the curves of best fit will exhibit the same characteristics as shown for a hot fluid leaking from the pipe. In other words a structural default which results in strain within the structure is signified by the peak of one of the curves being offset to the right of the reference curve. Thus, strain in a structure can be identified using the method of the present invention, using the method steps described above, and by identifying if one of the curves is offset to the right of the reference curve.

Similarly it should be understood that if the structural fault in the structure results in compression; then the peaks of the curves of best fit will exhibit the same characteristics as shown for a cold fluid leaking from the pipe. In other words a structural fault which results in strain within the structure is signified by the peak of one of the curves being offset to the left of the reference curve. Thus, compression in a structure can be identified using the method of the present invention, using the method steps described above, and by identifying if one of the curves is offset to the left of the reference curve.

Figure 3:
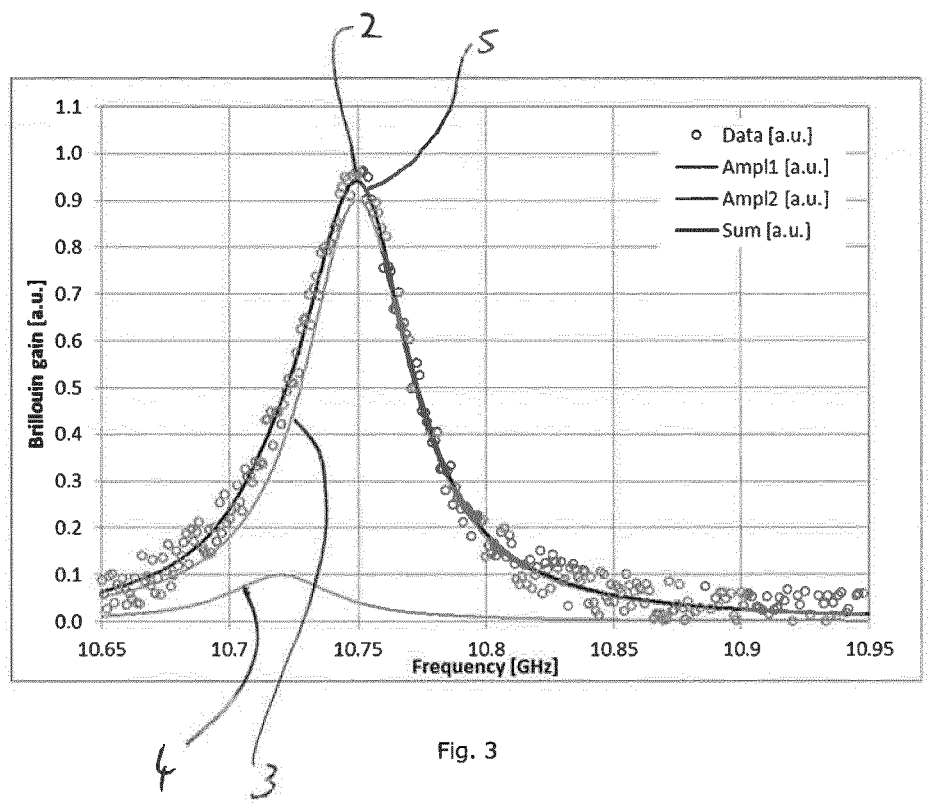
FIG. 3 is a graph showing an example of another Brillouin gain spectrum and two curves which, when added together, best fit the Brillouin gain spectrum.

FIG. 3 is a graph showing another example of Brillouin gain spectrum 2 obtained after performing a Brillouin measurement at a point along a sensing optical fiber. The graph in FIG. 3 also shows two curves 3,4 (i.e. first curve 3 and second curve 4) which have been identified as the two curves which best fit the Brillouin gain spectrum when they are added together. In other words the two curves 3,4, when added together form a line of best fit 5 for the Brillouin gain spectrum 2. The graph of FIG. 3 has many of the same features of the graph illustrated in FIG. 2 and like features are awarded the same reference numbers.

It can be seen in the graph of FIG. 3 the peak of the first curve 3 occurs at 10.75 GHz and the peak of the second curve 4 occurs at 10.72 GHz. Thus, the peaks of the first and second curves 3,4 occur at different frequencies, thereby indicating that there is a structural fault present in the region of the pipe which is adjacent to the point on the sensing optical fiber where the Brillouin measurement was performed.

As can be seen in the graph of FIG. 3, the peak of the first curve 3 occurs substantially at the same frequency 10.75 GHz as the peak of the Brillouin gain spectrum 2; accordingly the first curve 3 is identified as the reference curve 3. It will be understood that in many cases, in practice due to non idealities, the peak of the reference curve 3 may not occur precisely at the same frequency 10.75 GHz as the peak of the Brillouin gain spectrum 2. The peak of the reference curve 3 may be offset from the peak of the Brillouin gain spectrum 2 by between +−10 MHz>; therefore in another embodiment there is at least tolerance of +−10 MHz; thus the method may alternatively comprise the step of identifying which curve has its peak occurring at a frequency which is within +−10 MHz of the frequency at which the peak of the Brillouin gain spectrum occurs, as a reference curve. More preferably, the method may alternatively comprise the step of identifying which curve has its peak occurring at a frequency which is within +−2 MHz of the frequency at which the peak of the Brillouin gain spectrum occurs, as a reference curve. Most preferably the method may alternatively comprise the step of identifying which curve has its peak occurring at a frequency which is within +−1 MHz of the frequency at which the peak of the Brillouin gain spectrum occurs, as a reference curve.

As was the case for the previous example, in this example the structural fault happens to be crack in the pipe; fluid which is flowing in the pipe is leaking through the crack. The peak of the second curve 4 occurs at a different frequency to the frequency at which the peak of the reference curve 3 occurs, and the amplitude of the second curve 4 is larger than 1% of the amplitude of the reference curve 3, thus indicating that a structural fault (which in this example is a crack) is present in the pipe in the region of the pipe which is adjacent to the point on the optical sensing fiber where the Brillouin measurement was performed. The peak of the second curve 4 is offset to the left of the peak reference curve 3 indicating that a cold fluid is leaking from the pipe through the crack. The same is true for fluid leaking into the pipe through the crack (i.e. ingress).

Figure 4:
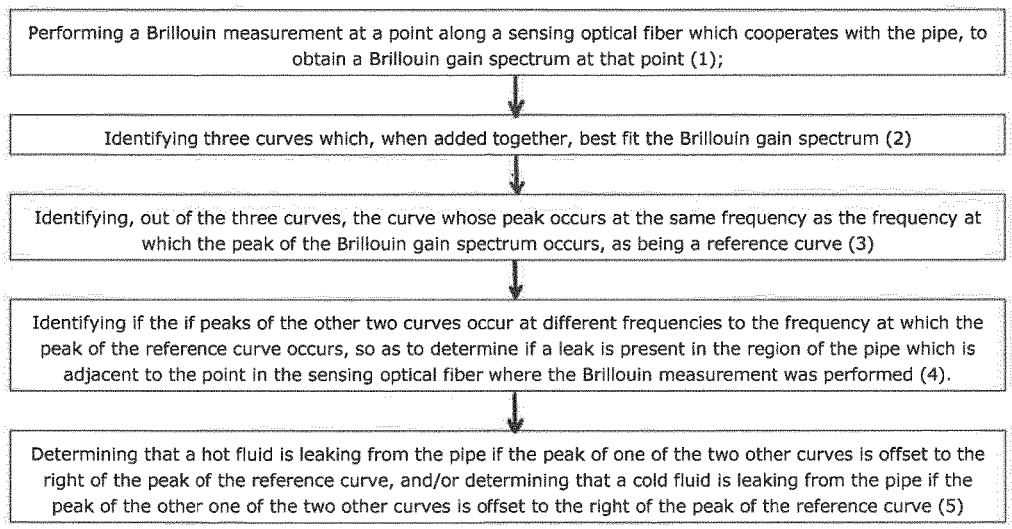
FIG. 4 is a flow chart illustrating a method for detecting a leak in a pipe according to a further embodiment of the present invention.

FIG. 4 is a flow chart illustrating a method for detecting a structural fault in a structure according to a further embodiment of the present invention. In this example the method is performed to detecting a structural fault in the form of a crack, in a structure in the forms of a pipe. As was the case in the previous embodiment, in this embodiment a Brillouin measurement is made at a point along a sensing optical fiber which cooperates with the pipe, to obtain a Brillouin gain spectrum at that point (1).

Next, three curves which, when added together, best fit the Brillouin gain spectrum, are identified (2). In other words the three curves, which, when added together, form the line of best fit for the Brillouin gain spectrum, are identified. It will be understood that any suitable technique may be used to identify the three curves; for example, a least mean square calculation may be used, or any other suitable fitting technique.

Next the curve whose peak occurs at the same frequency as the frequency where the peak of the Brillouin gain spectrum occurs, is identified as being a reference curve (3). It will be understood that in many cases, in practice due to non idealities, the peak of the reference curve may not occur precisely at the same frequency as the peak of the Brillouin gain spectrum. The peak of the reference curve may be offset from the peak of the Brillouin gain spectrum by between +−10 MHz>; therefore in variation of this embodiment there is at least tolerance of +−10 MHz; thus the method may alternatively comprise the step of identifying which curve has its peak occurring at a frequency which is within +−10 MHz of the frequency at which the peak of the Brillouin gain spectrum occurs, as a reference curve. More preferably, the method may alternatively comprise the step of identifying which curve has its peak occurring at a frequency which is within +−2 MHz of the frequency at which the peak of the Brillouin gain spectrum occurs, as a reference curve. Most preferably the method may alternatively comprise the step of identifying which curve has its peak occurring at a frequency which is within +−1 MHz of the frequency at which the peak of the Brillouin gain spectrum occurs, as a reference curve.

Next, after the reference curve has been identified, it is identified if the peaks of the other two curves occur at different frequencies to the frequency at which the peak of the reference curve occurs, so as to determine if a crack (structural fault) is present in the pipe in the region of the pipe which is adjacent to the point on the optical sensing fiber where the Brillouin measurement was performed (4). If the peak of at least one of the other two curves occurs at a different frequency to the frequency at which the peak of the reference curve occurs, and if the amplitude of the peak of said at least one curve is greater than 1% of the amplitude of the peak of the reference curve, this signifies the presence of a crack in the pipe at the point where the Brillouin measurement was performed; if the peak of only one of the other two curves occurs at a different frequencies to the frequency at which the peak of the reference curve occurs, this signifies the presence of a single crack in the pipe in the region of the pipe which is adjacent to the point on the optical sensing fiber where the Brillouin measurement was performed; and if the peak of both of the other two curves each occur at different frequencies to the frequency at which the peak of the reference curve occurs, this signifies the presence of two cracks in pipe in the region of the pipe which is adjacent to the point on the optical sensing fiber where the Brillouin measurement was performed. If the peaks of both of the other two curves occur at the same frequency to the frequency at which the peak of the reference curve occurs, or if both the other two curves have no peaks or have peaks which have an amplitude which is less than 1% the amplitude of the reference curve, this signifies that there is no crack present in the pipe in the region of the pipe which is adjacent to the point on the optical sensing fiber where the Brillouin measurement was performed.

Finally, if it is determined that there is two cracks present in the pipe, the following steps are then performed: determining that a hot fluid is leaking from the pipe through a crack, if the peak of one of the other two other curves is offset to the right of the peak of the reference curve; and/or determining that a cold fluid is leaking from the pipe through a crack if the peak of one of the other one of the two other curves is offset to the left of the peak of the reference curve (5). The same is true for fluid leaking into the pipe through the crack (i.e. ingress).

Figure 5:
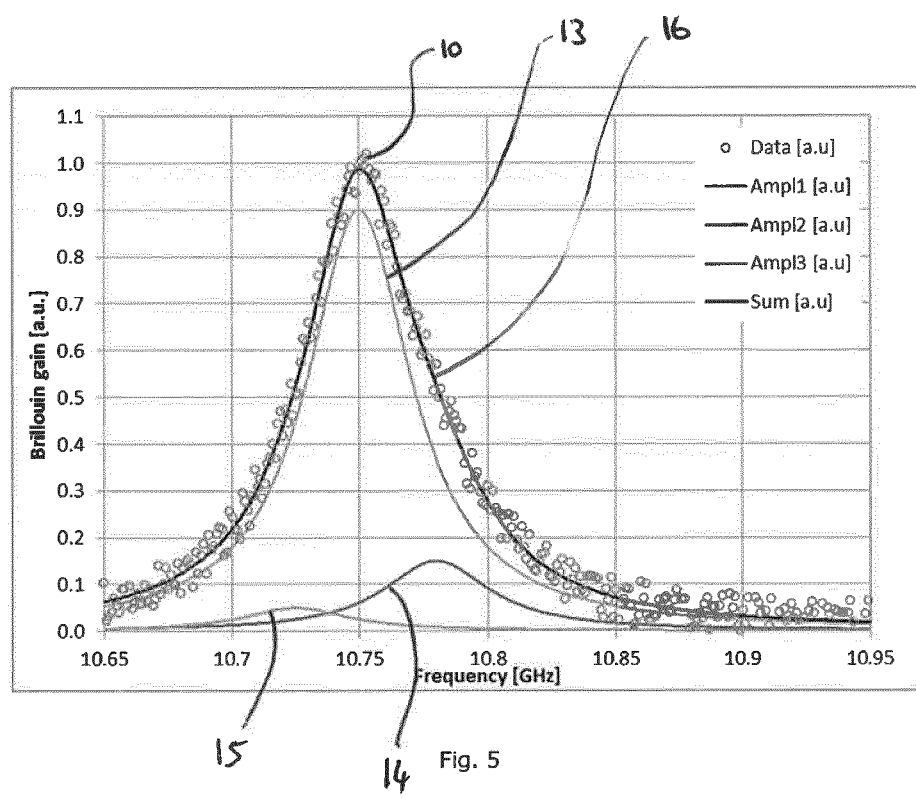
FIG. 5 is a graph showing an example of another Brillouin gain spectrum and three curves which, when added together, best fit the Brillouin gain spectrum.

FIG. 5 is a graph showing an example of Brillouin gain spectrum 10 obtained after performing the Brillouin measurement at a point along a sensing optical fiber, and shows the three curves 13-15 which best fit the Brillouin gain spectrum 10 when they are added together. In other words the three curves 13-15, when added together, form a line of best fit 16 for the Brillouin gain spectrum 10. In this example the three curves (i.e. first curve 13, second curve 14 and third curve 15) are each Lorentzian curves, however it will be understood that the curves may take any other suitable profile depending on the shape of the Brillouin gain spectrum 10 e.g the three curves may each be Gaussian curves. Also it will be understood that any suitable technique may be used to identify the curves 13-15 which, when added together, best fit the Brillouin gain spectrum 10; for example, a least mean square calculation may be used or any other suitable fitting technique.

The first curve 13, second curve 14 and third curve 15 each have a peak. It can be seen in the graph of FIG. 5 that the peaks of first, second and third curves 13-15 are offset from one another; the peak of the first curve 13 occurs at 10.75 GHz, the peak of the second curve 14 occurs at 10.78 GHz, and the peak of the third curve 15 occurs at 10.72 GHz. The fact that the peaks of the first and second curves 13,14 occur at different frequencies signifies the presence of a first crack present in the pipe in the region of the pipe which is adjacent to the point on the optical sensing fiber where the Brillouin measurement was performed; and the fact that the peaks of the first and third curves 13,15 occur at different frequencies signifies the presence of a second crack present in the pipe in the region of the pipe which is adjacent to the point on the optical sensing fiber where the Brillouin measurement was performed. Thus, it is determined that there are two cracks (i.e. two structural faults) present in the pipe present in the pipe in the region of the pipe which is adjacent to the point on the optical sensing fiber where the Brillouin measurement was performed.

It will be understood, that for this embodiment, if two of three curves 13-15 had peaks occurring at the same frequency and the other curve had a peak occurring at another frequency, then this would signify that there is only one crack present in the pipe in the region of the pipe which is adjacent to the point on the optical sensing fiber where the Brillouin measurement was performed. Likewise, if the peaks of all of the three curves 13-15 occurred at the same frequency, or if two of the three curves had no peak, or if two of the three curves each had a peak which had an amplitude which is less than 1% of the amplitude of the other of the three curves, then this would signify that there is no crack present in the pipe in the region of the pipe which is adjacent to the point on the optical sensing fiber where the Brillouin measurement was performed.

As can be seen in the graph of FIG. 5 the Brillouin gain spectrum 10 has a peak at 10.75 GHz. In this example the curve which has a peak occurring at the same frequency as the Brillouin gain spectrum is identified as a reference curve. As can be seen in the graph of FIG. 5, the peak of the first curve 13 occurs at the same frequency (i.e. 10.75 GHz) as the frequency at which the peak of the Brillouin gain spectrum 10 occurs; accordingly the first curve 13 is identified as a reference curve 13. The peak of the reference curve 13 may be offset from the peak of the Brillouin gain spectrum 10 by between +−10 MHz>; therefore in variation of this embodiment there is at least tolerance of +−10 MHz; thus the method may alternatively comprise the step of identifying which curve has its peak occurring at a frequency which is within +−10 MHz of the frequency at which the peak of the Brillouin gain spectrum 10 occurs, as a reference curve 13. More preferably, the method may alternatively comprise the step of identifying which curve has its peak occurring at a frequency which is within +−2 MHz of the frequency at which the peak of the Brillouin gain spectrum 10 occurs, as a reference curve 13. Most preferably the method may alternatively comprise the step of identifying which curve has its peak occurring at a frequency which is within +−1 MHz of the frequency at which the peak of the Brillouin gain spectrum 10 occurs, as a reference curve 13.

In this example fluids which are flowing in the pipe are leaking through each of the two cracks which were identified. The peak of the second curve 14 is offset to the right of the peak of the reference curve 13 signifying that a hot fluid is leaking from the pipe through one of the cracks. The third curve 15 is offset to the left of the peak of the reference curve 13 signifying that a cold fluid is leaking from the pipe through the other crack. Thus, it can be determined that the two cracks (structural faults) which are present in the pipe, in the region of the pipe which is adjacent to the point on the optical sensing fiber where the Brillouin measurement was performed, consist of one crack through which hot fluid is leaking from the pipe and one crack through which cold fluid is leaking from the pipe. The same is true for fluid leaking into the pipe through the crack (i.e. ingress).

It will be understood that if the peaks of both the second and third curves 14,15 were both offset to the right of the peak of the reference curve 13, this would signify that both of the cracks were cracks through which a hot fluid is leaking from the pipe. Likewise, if the peaks of both the second and third curves 14,15 were both offset to the left of the peak of the reference curve 13, this would signify that both of the cracks were cracks through which a cold fluid is leaking from the pipe. Both cracks are located within the instrument spatial resolution.

Figure 6:
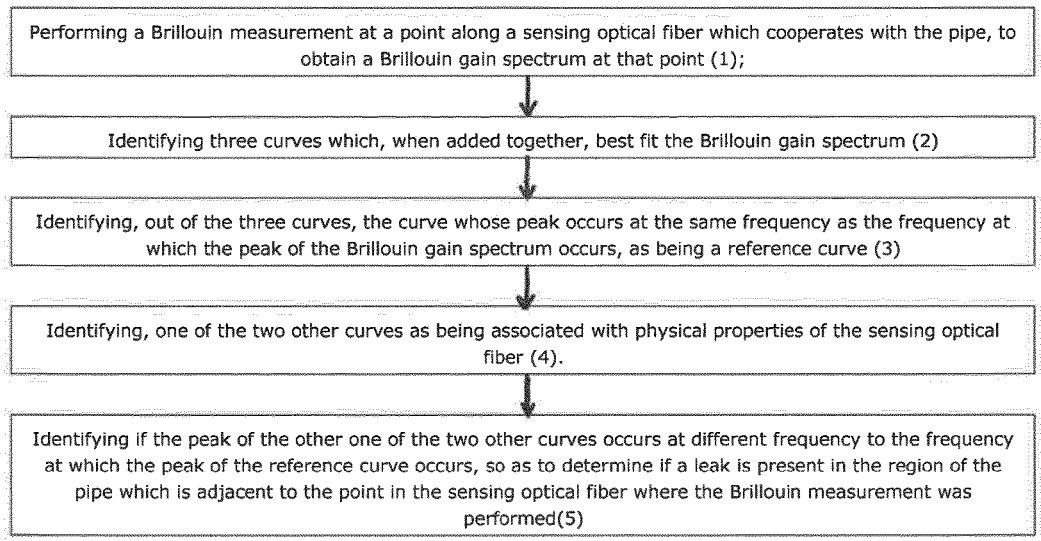

In most cases the physical properties of a sensing optical fiber can impact Brillouin measurement and thus affect the Brillouin gain spectrum. To address this problem a further embodiment of the present invention is proposed. FIG. 6 is a flow chart illustrating a method for detecting a structural fault (e.g. a crack) in a structure (e.g. a pipe) according to a further embodiment of the present invention. As was the case for the previous embodiments, this embodiment will be described for an example application of detecting a structural fault in the form of a crack, in a structure in the form of a pipe in which one or more fluids flow. However it will be understood, that the method may be used to detect any structural fault in any structure.

As was the case in the previous embodiments, a Brillouin measurement at a point along a sensing optical fiber which cooperates with the pipe, to obtain a Brillouin gain spectrum at that point, is performed (1).

Next, three curves which, when added together, best fit the Brillouin gain spectrum, are identified (2). In other words the three curves, when added together, form the line of best fit for the Brillouin gain spectrum, are identified. It will be understood that any suitable technique may be used to identify the three curves; for example, a least mean square calculation may be used or any other suitable fitting technique.

Next the curve whose peak occurs at the same frequency as the frequency where the peak of the Brillouin gain spectrum occurs, is identifies as being a reference curve (3). The peak of the reference curve may be offset from the peak of the Brillouin gain spectrum by between +−10 MHz>; therefore in variation of this embodiment there is at least tolerance of +−10 MHz; thus the method may alternatively comprise the step of identifying which curve has its peak occurring at a frequency which is within +−10 MHz of the frequency at which the peak of the Brillouin gain spectrum occurs, as a reference curve. More preferably, the method may alternatively comprise the step of identifying which curve has its peak occurring at a frequency which is within +−2 MHz of the frequency at which the peak of the Brillouin gain spectrum occurs, as a reference curve. Most preferably the method may alternatively comprise the step of identifying which curve has its peak occurring at a frequency which is within +−1 MHz of the frequency at which the peak of the Brillouin gain spectrum occurs, as a reference curve.

After the reference curve has been identified, one of the two other curves is identified as being associated with physical properties of the sensing optical fiber (4).

Finally, it is identified if the peak of the other one of the two other curves occurs at different frequency to the frequency at which the peak of the reference curve occurs, so as to determine if a crack is present in the pipe in the region of the pipe which is adjacent to the point on the optical sensing fiber where the Brillouin measurement was performed (5). If the peak of the other one of the two other curves occurs at a different frequency to the frequency at which the peak of the reference curve occurs, this signifies the presence of a crack in the pipe in the region of the pipe which is adjacent to the point on the optical sensing fiber where the Brillouin measurement was performed; if the peak of the other one of the two other curves occurs at substantially the same frequency to the frequency at which the peak of the reference curve occurs (i.e. if the peak of the other one of the two other curves occurs within +−10 MHz, +−2 MHz, or +−1 MHz of the frequency at which the peak of the reference curve occurs) or if the other one of the two other curves has an amplitude which is substantially zero (i.e. if the other one of the two other curves has an amplitude which is less than 1% of the amplitude of the peak of the reference curve), this signifies that there is no crack presence in the pipe in the region of the pipe which is adjacent to the point on the optical sensing fiber where the Brillouin measurement was performed.

If it determined that there is a crack present in the pipe it may further, optionally, be determined if the hot or cold fluid is leaking from the pipe through that crack, based on whether the peak of the other one of the two other curves is offset to the right or offset to the left of the peak of the reference curve. If the peak of the other one of the two other curves is offset to the right of the peak of the reference curve then it is determined that a hot fluid is leaking from the pipe through the crack; and if the peak of the other one of the two other curves is offset to the left of the peak of the reference curve then it is determined that a cold fluid is leaking from the pipe through the crack. The same is true for fluid leaking into the pipe through the crack (i.e. ingress).

Figure 7:
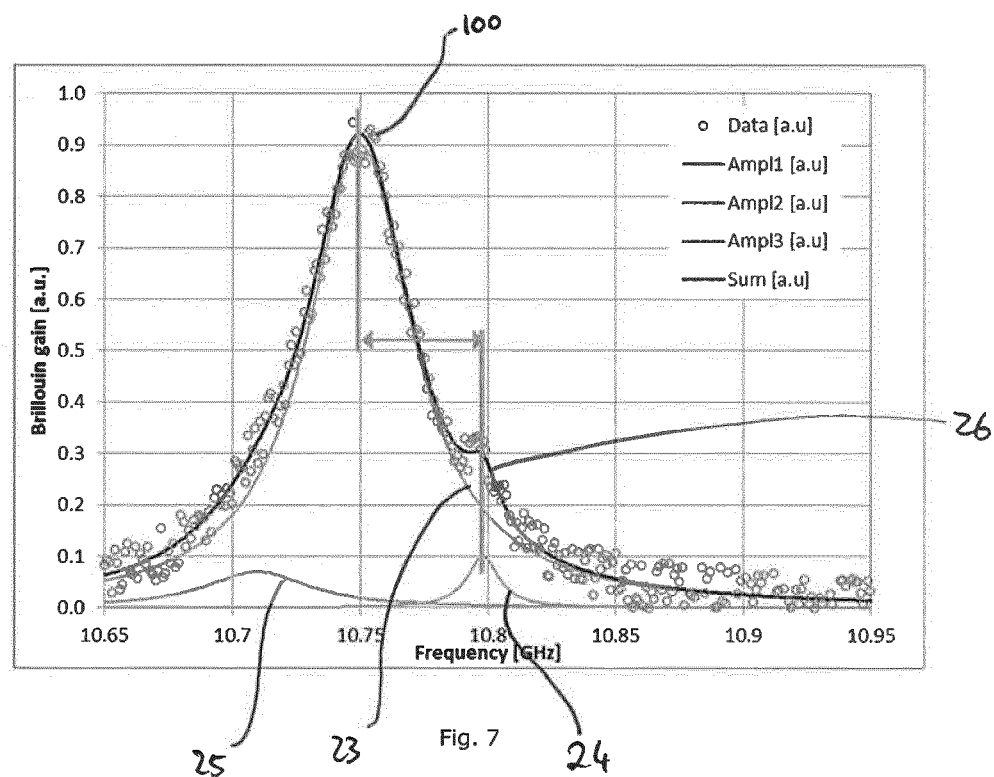
FIG. 7 is a graph showing an example of another Brillouin gain spectrum and three curves which, when added together, best fit the Brillouin gain spectrum, one of the three curves being associated with physical properties of the sensing optical fiber.

FIG. 7 is a graph showing an example of Brillouin gain spectrum 100 obtained after performing the Brillouin measurement at a point along a sensing optical fiber, and shows the three curves 23-25 which, when added together, best fit the Brillouin gain spectrum. In other words the three curves 23-25, when added together, form a line of best fit 26 for the Brillouin gain spectrum 100. In this example the three curves (i.e. first curve 23, second curve 24 and third curve 25) are each Lorentzian curves, however it will be understood that the curves may take any other suitable profile depending on the shape of the Brillouin gain spectrum 100 e.g the three curves may each be Gaussian curves. Also it will be understood that any suitable technique may be used to identify the curves 23-25 which, when added together, best fit the Brillouin gain spectrum; for example, a least mean square calculation may be used or any other suitable fitting technique.

The first curve 23, second curve 24 and third curve 25 each have a peak occurring at 10.75 GHz, 10.79 GHz and 10.71 GHz respectively. The Brillouin gain spectrum 10 has a peak at 10.75 GHz. The curve which has a peak occurring at the same frequency as the Brillouin gain spectrum is identified as a reference curve. As can be seen in the graph of FIG. 7, the peak of the first curve 23 occurs at the same frequency 10.75 GHz as the peak of the Brillouin gain spectrum; accordingly the first curve 23 is identified as a reference curve 23. The peak of the reference curve 23 may be offset from the peak of the Brillouin gain spectrum 100 by between +−10 MHz>; therefore in variation of this embodiment there is at least tolerance of +−10 MHz; thus the method may alternatively comprise the step of identifying which curve has its peak occurring at a frequency which is within +−10 MHz of the frequency at which the peak of the Brillouin gain spectrum 100 occurs, as a reference curve 23. More preferably, the method may alternatively comprise the step of identifying which curve has its peak occurring at a frequency which is within +—2 MHz of the frequency at which the peak of the Brillouin gain spectrum 100 occurs, as a reference curve 23. Most preferably the method may alternatively comprise the step of identifying which curve has its peak occurring at a frequency which is within +−1 MHz of the frequency at which the peak of the Brillouin gain spectrum 10 occurs, as a reference curve 23.

Next the second curve 24 is identified as being associated with physical properties of the sensing optical fiber. The step of identifying second curve 24 as being associated with physical properties of the sensing optical fiber, may comprise identifying which of the second or third curves 24,25 has a peak occurring at the same frequency as a curve which was identified as being associated with physical properties of the sensing optical fiber during a calibration step. The calibration step may comprise performing a Brillouin measurement at a point along a sensing optical fiber which cooperates with a part of the pipe which has no structural fault, to obtain a Brillouin gain spectrum at that point; identifying three curves which, when added together, best fit the Brillouin gain spectrum; and identifying the curve whose peak occurs, at the same frequency as the frequency at which the peak of Brillouin gain spectrum occurs, or at a frequency which is within +−10 MHz, +−2 MHz, or +−1 MHz of the frequency at which the peak of Brillouin gain spectrum occurs, as being a reference curve; and identifying the one of the two other curves, which has a peak at a frequency which is outside the range +−10 MHz, +−2 MHz, or +−1 MHz, of the frequency at which the peak of the reference curve occurs, and/or which has peak which has an amplitude which is greater than 1% of the amplitude of the peak of the reference curve, as being associated with physical properties of the sensing optical fiber. Since in the calibration step, there is no structural fault in the pipe at the point where the Brillouin measurement was performed, the other of the two other curves will have its peak at a frequency which is equal to the frequency at which the peak of the reference curve occurs or else will have no peak at all (or at least will have an amplitude which is less than 1% of the amplitude of the peak of the reference curve). Therefore, in the present embodiment, referring to FIG. 7, the second curve 24 is identified as being associated with physical properties of the sensing optical fiber as it is identified as being equal to (i.e. has a peak occurring at substantially the same frequency and has substantially the same amplitude) the curve which was identified as being associated with physical properties of the sensing optical fiber in the calibration step.

An offset is determined by measuring the difference between the frequency 10.75 GHz at which the peak of the reference curve 23 occurs and the frequency 10.79 GHz at which the peak of the second curve 24, which is associated with physical properties of the sensing optical fiber, occurs. In this example the offset is 0.15 GHz. The offset represents the effect of the physical properties of the sensing optical fiber e.g. the fiber intrinsic properties, on the Brillouin gain spectrum of the sensing optical fiber. Optionally, the offset may be used when performing the method on, for example, another part of the pipe, to fix the position of one of the curves when determining the curves which, when added together, best fit the Brillouin gain spectrum 100; in this case one of the curves is fixed so that its peak occurs at a frequency which is offset by 0.15 GHz from the reference curve, or may be fixed so that its peak occurs at a frequency of 10.79 GHz; then the other variables of the curves are adjusted to achieve the best fit to the Brillouin gain spectrum.

The remaining third curve 25 is then used to determine if there is a crack (structural fault) present in the pipe in the region of the pipe which is adjacent to the point on the optical sensing fiber where the Brillouin measurement was performed. If the peak of the third curve 25 occurs at a different frequency to the frequency at which the peak of the reference curve occurs 23, this will signify that there is a crack present in the pipe in the region of the pipe which is adjacent to the point on the optical sensing fiber where the Brillouin measurement was performed; if the peak of the third curve 25 occurs at the same frequency to the frequency at which the peak of the reference curve occurs 23, or if the third curve 25 has no peak at all, or if the third curve 25 has a peak which has an amplitude which is less than 1% of the amplitude of the peak of the reference curve 23, this will signify that there is no crack present in the pipe in the region of the pipe which is adjacent to the point on the optical sensing fiber where the Brillouin measurement was performed. It can be seen in the graph of FIG. 7 that the peak of the third curve 25 occurs at 10.72 GHz and the peak of the reference curve 23 occurs at 10.75 GHz and that the amplitude of the peak of the third curve is greater than 1% of the amplitude of the peak of the reference curve 23; this signifies that a crack present in the pipe in the region of the pipe which is adjacent to the point on the optical sensing fiber where the Brillouin measurement was performed.

Since the peak of the third curve 25 is offset to the left of the peak of the reference curve 23, this indicates that a cold fluid is leaking from the pipe through the crack. Likewise, it will be understood that if the peak of the third curve 25 was offset to the right of the peak of the reference curve 23, this would indicate that a hot fluid is leaking from the pipe through the crack.

It will be understood that, in the present application, a peak of a first curve will be offset to the right of the peak of another, second, curve if the frequency at which the peak of the first curve occurs is larger than the frequency at which the peak of the second curve occurs. Likewise, it will be understood that a peak of a first curve will be offset to the left of the peak of another, second, curve if the frequency at which the peak of the first curve occurs is less than the frequency at which the peak of the second curve occurs.

As mentioned the method of the present invention may be applied to detect structural faults in any structure. For example the method of the present invention may be applied to detect structural faults in a riser, umbilical, power cable or flowline. It will be understood that if the method of the present invention is to be applied to detect structural faults in a riser, umbilical, power cable or flowline, then the sensing optical fiber in which the Brillouin measurement is performed should be arranged to operably cooperate with the riser, umbilical, power cable or flowline. Additionally, as mentioned the method of the present invention may be used to detect any type of structural fault, in particular, but not exclusively structural faults which result in leaks and/or structural faults which result in strain within the structure. Thus, indirectly, the method of the present invention can be used to detect leaks or strain within a structure.

Figure 8:
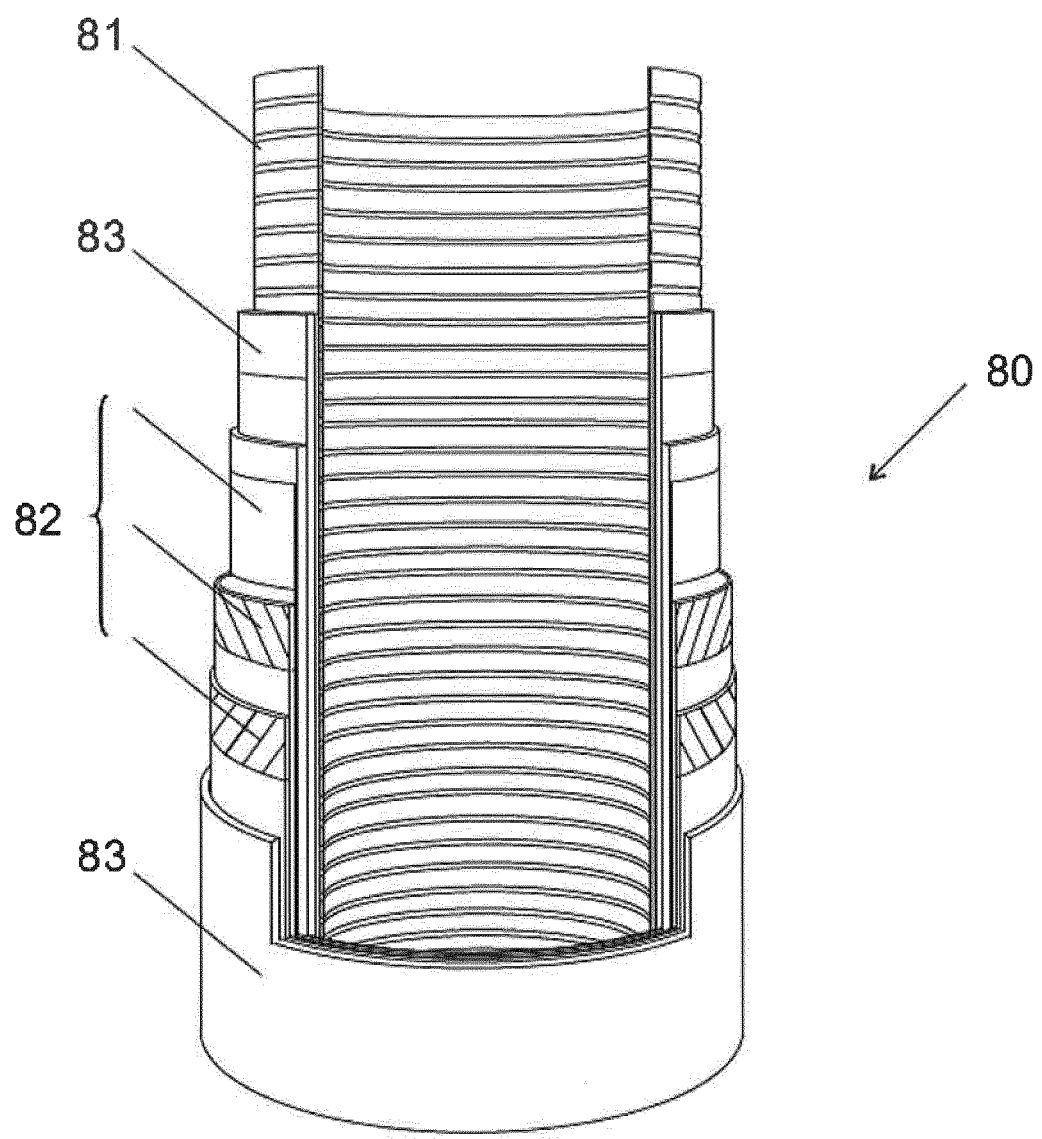
FIG. 8 shows a perspective view of a riser.

A riser is a large hose pipe which usually serves as a conduit to lift oil from the seabed to the platform for processing. FIG. 8 shows a perspective view of a riser 80; the riser 80 comprises a central pipe 81, which is usually composed of polymer; the central pipe 81 is surrounded by multiple layers of metal armoured wires 82. These armoured wires 82 serve to prevent the riser 80 from collapsing inwards due to subsea water pressure or from exploding due to fluid pressure within the riser 80. The riser 80 further comprises an additional polymer layers 83 of which provides protection and water tightness.

The riser 80 may become damaged during transportation, installation, or during use, for example, so that it suffers from a structural fault. In some cases, the polymer layer 83 becomes broken and a crack is formed in the polymer layer 83; fluid such as sea-water leaks from outside the riser through the crack in the polymer layer 83 to the metal armoured wires; the sea-water will cause corrosion of some metal armoured wires 82 and will cause the metal armoured wires 82 to beak. When too many metal armoured wires 82 are broken, the riser 80 may collapse inwards due to the pressure or its own weight. Similarly, the central pipe 81 of the riser 80 may have a structural fault which results in gas/oil which is contained within the riser 80, to leak into the metal armoured wires 82; this will cause corrosion of the metal armoured wires 82 which again will result in the metal armoured wires 82 breaking and the riser 80 collapsing inwards due to the pressure or its own weight. Thus, the detection of structural faults in risers 80 is critical to prevent fluid ingress or fluid leakage which would ultimately result in destruction of the riser 80.

The same method steps disclosed above for detecting cracks in the pipe are used to detect if there is a structural fault in a riser 80. Similarly, the same steps, disclosed above, to determine if a hot or cold fluid is leaking into or out of the pipe, may be used to determine if a hot or cold fluid is leaking into or out of a riser 80.

Notably if the metal armoured wires 82 of the riser corrode and break, this breakage in the metal armoured wires 82 is a structural fault which results in an increase in local strain in the riser in the region where the metal armoured wires 82 are corroded. The same method steps disclosed above for detecting cracks in the pipe are used to detect if there is the structural fault e.g. breakage of metal armoured wires 82, in the riser 80. Due to the strain in the riser in the region where the metal armoured wires 82 are broke, the curves of best fit will exhibit the same characteristics as if there is a leak of hot fluid in that region of the riser; in other words the peak of one of the curves will be offset to the right of the reference curve. Thus, it can be determined that the breakage of the metal armoured wires 82 has caused strain within the riser, if the peak of one of the curves is offset to the right of the reference curve. It will also be understood that stain within the riser may results from factors other than corrosion of metal armoured wires 82.

Additionally, the same method steps disclosed above for detecting cracks in the pipe are used to detect if there is a structural fault in an umbilical or a flowline. Similarly, the same steps to determine if a hot or cold fluid is leaking into or out of the pipe may be used to determine if a hot or cold fluid is leaking into or out of an umbilical or flowline. An umbilical is an assembly of different cables, tubes, power cables, spacers etc used to transport energy from the platform to the seabed. An flowline is a pipeline which is usually dedicated to the transport of raw products, compared to a pipeline which is usually dedicated to the transport of refined products. Some flowlines, likewise some pipelines can be built around a central tube which carries the gas/oil/raw product, the central tube being externally insulated (thermally) and sometimes heated, and surrounded by a second tube for protection purposes.

The method of the present invention may also be used to detect structural faults in power cables. The same method steps disclosed above for detecting cracks in the pipe are used to detect if there is a structural fault in a power cable. For example, a power cable may have a structural fault which is a mechanically weakened section or break which was caused, for example, by an impact on the power cable; this mechanically weakened section or breakage can be detected using the same method steps disclosed above for detecting cracks in the pipe.

Typically a weakened section or a breakage of the power cable will change the electric resistance of the conductor, mainly by increasing it due to a reduction in its section. As current flow, and because heat dissipation is proportional to the resistance, locally the temperature will increase; this results in local hot spot in the power cable. In many cases the a power cable will be protected by a protective sheath; a structural fault which results in damage to this structural sheath and exposure of the power cable may result in a local cold spot occurring in the power cable; for example if the power cable is embedded in the seabed, and the power cable has a structural fault which results in damage to the structural sheath which results in exposure of the power cable to the sea water, this will result in local cold spot occurring in the power cable at the point where the power cable is exposed to the sea water. The same steps, described above, to determine if a hot fluid is leaking into, or out, of the pipe may be used to determine if a structural fault in the power cable has resulted in a local hot spot in the power cable; likewise, the same steps, described above, to determine if a cold fluid is leaking into, or out, of the pipe may be used to determine if a structural fault in the power cable has resulted in a local cold spot in the power cable.

By monitoring for the occurrence of local hot or cold spots along the power cable, the load on the cable may be dynamically optimized. An embodiment of the present invention may therefore include a step of dynamically adjusting load on a power cable according to the number of local hot or cold spots which are detected in the power cable. The method may comprise decreasing the load on the power cable if the number of local hot spots and/or cold spots which are detected in the power cable is above a threshold number; and/or increasing the load on the power cable if the number of local hot and/or cold spots which are detected in the power cable exceeds that threshold number. For example, if no local hot or cold spots are detected in the power cable, or if the number of hot and/or cold spots which are detected in the power cable is below a threshold number, then the load on the cable may be increased; for example when considering a wind farm export power cable, load is increased during high wind by allowing turbines to produce more electricity. Alternatively, if the number of local hot and/or cold spots which are detected in the power cable is above a threshold number, then the load on the cable may be decreased; for example when considering a wind farm export power cable, load is decreased during high wind by stopping 1 or more turbines form producing electricity Various modifications and variations to the described embodiments of the invention will be apparent to those skilled in the art without departing from the scope of the invention as defined in the appended claims. For example, It will be understood that the sensing optical fiber will preferably extend along the whole length of the pipe; and preferably, the method steps described in the above-mentioned embodiments may be repeated at each of a plurality of different points along the whole length of the sensing optical fiber, so that the whole length of the pipe is tested for leaks.

Those skilled in the art will understand that the method of the present invention may also be used to detect structural faults of a structure such as elongation or compression of the structure. Without departing from the scope of the invention, a structural fault of an elongation or compression of the structure, e.g. a local elongation or compression of the structure, affects the sensing optical fiber in a similar fashion to the manner in which a crack in the structure affects the sensing optical fiber; accordingly the structural fault of an elongation or compression of the structure produces similar Brillouin gain spectrums as shown above, with similar characteristics. Thus, the method of the present invention, e.g. any one of the embodiments described above, can be used to detect the presence of a structural fault in the form of elongation or compression of the structure.

Although the invention has been described in connection with specific preferred embodiments, it should be understood that the invention as claimed should not be unduly limited to such specific embodiment.

What is claimed is:

1. A method for detecting a structural fault in a structure, comprising the steps of,
    (a) performing a Brillouin measurement at a point along a sensing optical fiber which operably cooperates with the structure, to obtain a Brillouin gain spectrum at that point;
    (b) identifying at least two curves which, when added together, best fit the Brillouin gain spectrum;

(c) identifying if peaks of the least two curves occur at different frequencies so as to determine if the structure has a structural fault.

2. The method of claim 1 wherein the structure comprises at least one of a pipe, riser, umbilical, power cable.

3. The method of claim 1 wherein the structural fault is a structural fault which gives rise to strain or compression in the structure.

4. The method of claim 1 wherein the structural fault is a crack through which fluid leaks out of the structure or fluid leaks into the structure.

5. The method according to claim 4 comprising the steps of,
identifying out of the least two curves, the curve whose peak occurs at a frequency which is within +−10 MHz of the frequency at which the peak of the Brillouin gain spectrum occurs, as being a reference curve and
determining if hot or cold fluid is leaking through the structure at the structural fault based on whether the peak of the other of the at least two curves is offset to the right or offset to the left of the peak of the reference curve.

6. The method according to claim 5 comprising the step of, determining that a hot fluid is leaking through the structure at the structural fault if the peak of one of the other of the at least two curves is offset to the right of the peak of the reference curve.

7. The method according to claim 5 comprising the step of, determining that a cold fluid is leaking through the structure at the structural fault if the peak of one of the other of the at least two curves is offset to the left of the peak of the reference curve.

8. The method according to claim 1 comprising the step of identifying three curves which, when added together, best fit the Brillouin gain spectrum.

9. The method according to claim 8 comprising the steps of,
identifying, out of the three curves, the curve whose peak occurs at a frequency which is within +−10 MHz of the frequency at which the peak of Brillouin gain spectrum occurs, as being a reference curve; and
identifying if the peaks of the other two curves occur at different frequencies to the frequency at which the peak of the reference curve occurs, so as to determine if a structural fault is present in the region of structure which is adjacent to the point on the optical sensing fiber where the Brillouin measurement was performed; and,
if it is determined that there is a structural fault present in the structure, then carrying out the step(s) of,
determining that a hot fluid is leaking through the structure at the structural fault if the peak of one of the two other curves is offset to the right of the peak of the reference curve; and/or
determining that a cold fluid is leaking through the structure at the structural fault if the peak of the other one of the two other curves is offset to the right of the peak of the reference curve.

10. The method according to claim 8 comprising the steps of,
identifying, out of the three curves, the curve whose peak occurs at a frequency which is within +−10 MHz of the frequency at which the peak of Brillouin gain spectrum occurs, as being a reference curve; and
identifying one of the two other curves as being associated with physical properties of the sensing optical fiber;

determining a structural fault is present in the structure if the peak of the other one of the two other curves occurs at a different frequency to the frequency at which the peak of the reference curve occurs.

11. The method according to claim 10, further comprising, performing a calibration step at a point along the structure which does not comprise a structural fault, the calibration step comprising,
(a) performing a Brillouin measurement at a point along a sensing optical fiber which is adjacent said point along the structure which does not comprise a structural fault, to obtain a Brillouin gain spectrum at that point;
(b) identifying at least three curves which, when added together, best fit the Brillouin gain spectrum;
(c) identifying, out of the three curves, the curve whose peak occurs at a frequency which is within +−10 MHz of the frequency at which the peak of Brillouin gain spectrum occurs, as being a reference curve; and
(d) identifying one of the two other curves which has a peak greater than 1% of the amplitude of the reference curve, as being associated with physical properties of the sensing optical fiber;
(e) identifying the frequency at which the peak of the curve associated with physical properties of the sensing optical fiber, occurs; and
wherein the step of identifying one of the two other curves as being associated with physical properties of the sensing optical fiber, comprises identifying one of the two other curves which has a peak occurring at a frequency which is within +−10 MHz of the frequency identified in step (e) of the calibration step, as being associated with physical properties of the sensing optical fiber.

12. The method according to claim 10 comprising the step of, determining an offset by measuring the difference between the frequency at which the peak of the reference curve occurs and the frequency at which the curve associated with physical properties of the sensing optical fiber occurs.

13. The method according to claim 8, further comprising, performing a calibration step at a point along the structure which does not comprise a structural fault, the calibration step comprising,
(a) performing a Brillouin measurement at a point along a sensing optical fiber which is adjacent said point along the structure which does not comprise a structural fault, to obtain a Brillouin gain spectrum at that point;
(b) identifying at least three curves which, when added together, best fit the Brillouin gain spectrum;
(c) identifying, out of the three curves, the curve whose peak occurs at a frequency which is within +−10 MHz of the frequency at which the peak of Brillouin gain spectrum occurs, as being a reference curve; and
(d) identifying one of the two other curves which has a peak greater than 1% of the amplitude of the reference curve, as being associated with physical properties of the sensing optical fiber;
(e) identifying the frequency at which the peak of the curve associated with physical properties of the sensing optical fiber, occurs; and
wherein the step of identifying three curves which, when added together, best fit the Brillouin gain spectrum, comprises fixing one of the three curves so that its peak occurs at a frequency which is equal to the frequency identified in step (e) of the calibration step.

14. The method according to claim 1 comprising the step of,
- repeating each of the steps of the method at a plurality of points along the sensing optical fiber.

15. An apparatus for detecting a structural fault in a structure, the apparatus comprising,
- a Brillouin measurement means which is operable to take a Brillouin measurement at a point along a sensing optical fiber which cooperates with the structure, so as to obtain a Brillouin gain spectrum at that point;
- a processor which is operable to receive a Brillouin gain spectrum obtained by the Brillouin measurement means, and to identify at least two curves which, when added together, best fit the Brillouin gain spectrum, wherein the processor is configured to,
- present said at least two curves so that a user can inspect the at least two curves to identify if peaks of the least two curves occur at different frequencies, so as to determine if the structure has a structural fault; and/or to
- identify if peaks of the least two curves occur at different frequencies, so as to determine if the structure has a structural fault.

* * * * *